United States Patent
Tham et al.

(10) Patent No.: US 10,101,231 B2
(45) Date of Patent: Oct. 16, 2018

(54) OVERLOAD SAFE PRESSURE SENSOR, ESPECIALLY PRESSURE DIFFERENCE SENSOR

(75) Inventors: Anh Tuan Tham, Berlin (DE); Rafael Teipen, Berlin (DE); Michael Philipps, Lorrach (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 1747 days.

(21) Appl. No.: 13/516,423

(22) PCT Filed: Nov. 11, 2010

(86) PCT No.: PCT/EP2010/067251
§ 371 (c)(1),
(2), (4) Date: Jun. 15, 2012

(87) PCT Pub. No.: WO2011/076477
PCT Pub. Date: Jun. 30, 2011

(65) Prior Publication Data
US 2012/0265455 A1   Oct. 18, 2012

(30) Foreign Application Priority Data
Dec. 22, 2009 (DE) .................. 10 2009 055 149

(51) Int. Cl.
*G01L 9/00* (2006.01)
*G01L 9/08* (2006.01)
(Continued)

(52) U.S. Cl.
CPC .......... *G01L 13/025* (2013.01); *G01L 9/0044* (2013.01); *G01L 19/04* (2013.01); *G01L 19/0618* (2013.01)

(58) Field of Classification Search
CPC .................................................. G01L 9/0044
See application file for complete search history.

(56) References Cited

U.S. PATENT DOCUMENTS 3,800,413 A   4/1974  Frick
4,086,815 A   5/1978  Asano et al.
(Continued)

FOREIGN PATENT DOCUMENTS

DE   109073        10/1974
DE   3341735 A1    5/1984
(Continued)

OTHER PUBLICATIONS

International Preliminary Report on Patentability and Written Opinion of the International Searching Authority in corresponding PCT Application No. PCT/EP2010/067251, dated Jul. 19, 2012.
(Continued)

*Primary Examiner* — Lisa Caputo
*Assistant Examiner* — Herbert K Roberts
(74) *Attorney, Agent, or Firm* — Bacon & Thomas, PLLC (57) ABSTRACT

A pressure sensor includes a sensor body with a sensor chamber in the interior, at least a first separating membrane, forming a first separating membrane chamber connected with the sensor body. A measuring membrane divides the sensor chamber into two chamber portions. A pressure transfer liquid, with which the first separating membrane chamber, the first chamber portion and a channel therebetween are filled, in order to transfer a pressure to the measuring membrane; wherein the pressure sensor is specified for a temperature range between a minimum temperature and a maximum temperature, as well as for a pressure range. At the minimum temperature, the pressure transfer liquid volume in the first chamber portion, the first channel and the first separating membrane chamber is sufficient over the total pressure range to transfer the pressure to the measuring membrane, without the first separating membrane coming to rest, and that when, in the case of overload at maximum temperature, the entire pressure transfer liquid
(Continued)

volume moves out of the first separating membrane chamber into the first chamber portion, and is accommodated by the measuring membrane, the measuring membrane experiences no plastic deformation.

27 Claims, 3 Drawing Sheets

(51) Int. Cl.
*G01L 13/02* (2006.01)
*G01L 19/04* (2006.01)
*G01L 19/06* (2006.01)

(56) References Cited

U.S. PATENT DOCUMENTS

| | | | | |
|---|---|---|---|---|
| 4,173,900 A | * | 11/1979 | Tanabe et al. | 73/727 |
| 4,501,051 A | * | 2/1985 | Bell | G01L 9/0075 29/25.41 |
| 4,949,581 A | * | 8/1990 | Rud, Jr. | 73/706 |
| 6,058,780 A | * | 5/2000 | Bernot | G01L 9/0075 361/283.4 |
| 7,451,653 B1 | * | 11/2008 | Sippola | G01L 9/0042 73/715 |
| 2004/0237658 A1 | * | 12/2004 | Ohms | G01L 9/0073 73/718 |

FOREIGN PATENT DOCUMENTS

| | | |
|---|---|---|
| DE | 3436184 C1 | 12/1985 |
| DE | 10228618 A1 | 1/2004 |
| DE | 102006058927 A1 | 6/2008 |
| DE | 102008019054 A1 | 11/2009 |

OTHER PUBLICATIONS

German Search Report in corresponding German Application No. 10 2009 055 149.2, dated Jun. 11, 2010.
International Search Report in corresponding PCT Application No. PCT/EP2010/067251, dated Feb. 21, 2011.

* cited by examiner

OVERLOAD SAFE PRESSURE SENSOR, ESPECIALLY PRESSURE DIFFERENCE SENSOR

TECHNICAL FIELD

The present invention relates to overload safe pressure sensors, especially a pressure difference sensor of such type.

BACKGROUND DISCUSSION

Pressure sensors and especially pressure difference sensors are usually specified for a measuring range, in which they provide a pressure-dependent, measured value, wherein, in the ideal case, they should withstand significant overloading beyond the specified measuring range without damage to the sensor. This is the case all the more so for pressure difference sensors, as, in this case, the static pressures, whose difference is to be ascertained, can by all means exceed the measuring range of the difference to be ascertained by a factor of, for example, a thousand, so that in the case of a malfunction, when only one side of the measuring membrane is exposed to a pressure difference with a static pressure, a thousand-fold overload can easily arise. Measuring membranes of pressure difference sensors must be protected against this.

For this, an approach exists for the provision of overload membranes, which are connected in parallel to the measuring membrane of the pressure sensor in a hydraulic measuring mechanism. These overload membranes have a larger hydraulic capacity than the measuring membrane of the pressure difference sensor. The two static pressures, whose difference is to be ascertained, are, in the case of such pressure difference sensors, usually introduced into the measuring mechanism via pressure transfer means having process membranes or separating membranes, which are in each case arranged over a membrane bed. In the case of a one-sided overload, the deflection of the overload membrane accommodates the volume under the separating membrane exposed to the overload, until the latter bears down on the membrane bed, whereby a further pressure rise on the measuring membrane is prevented.

Pressure difference measuring devices with such an overload membrane are available commercially from the assignee under the marks Deltabar S and Deltabar M.

Another approach is based on the provision of a membrane bed for the measuring membrane, on which the measuring membrane bears down in the case of a one-sided overload, whereby the measuring membrane is supported and is protected from damage.

Both approaches have their specific weaknesses, for an overload membrane leads, as a rule, to a greater hydraulic volume, which, in the case of a given pressure, leads to greater forces and therewith to a more complex mechanical construction.

A support for the measuring membrane on a membrane bed, which, for example, has a contour, which corresponds to the deflection curve the measuring membrane, is, for example, only compatible with the established capacitive measuring transducers under certain conditions, since this support usually has, as opposed to a full surface electrode on the measuring membrane, an annular reference electrode, which surrounds a circular measuring electrode, wherein the measuring electrode and the reference electrode have in the high position of the measuring membrane the same capacitance with respect to the electrode of the measuring membrane.

In such case, the measuring electrode and the reference electrode especially have the same distance from the measuring membrane. In this respect, the reference capacitance between the reference electrode and the electrode of the measuring membrane changes to a significantly smaller degree than the pressure-dependent capacitance between the measuring electrode and the electrode of the measuring membrane when the measuring membrane is deflected in a pressure-dependent manner. This assumption is no longer valid when the annular reference electrode and the measuring electrode are arranged on a membrane bed, which has a contour, which is predetermined by the deflection curve of the measuring membrane.

Additionally, the danger exists that a measuring membrane supported on the membrane bed remains clinging to the membrane bed after the overload goes away.

SUMMARY OF THE INVENTION

An object of the present invention is therefore to provide an overload-resistant pressure sensor, which overcomes the disadvantages of the state of the art.

The pressure sensor of the invention includes a sensor body with a sensor chamber in its interior; at least a first separating membrane, which is connected with the sensor body to form a first separating membrane chamber; a measuring membrane, which divides the sensor chamber into two chamber portions; a pressure transfer liquid, with which the first separating membrane chamber, the first chamber portion and a channel therebetween are filled, in order to transfer a pressure to the measuring membrane; wherein the pressure sensor is specified for a temperature range between a minimum temperature and a maximum temperature, as well as for a pressure range, wherein, at the minimum temperature, the pressure transfer liquid volume in the first chamber portion, the first channel and the first separating membrane chamber is sufficient over the total pressure range to transfer the pressure to the measuring membrane, without the first separating membrane coming to rest, and wherein when, in the case of overload at maximum temperature, the entire pressure transfer liquid volume moves out of the first separating membrane chamber into the first chamber portion, and is accommodated by the measuring membrane, the measuring membrane experiences no plastic deformation.

The pressure sensor of the invention includes in a further development a sensor body with at least a first surface section, which communicates via a first channel with a sensor chamber in the interior of the sensor body; at least a first separating membrane, which covers the first surface section and, forming a first separating membrane chamber, is pressure-tightly connected along a peripheral edge with the sensor body; a measuring membrane, which divides the sensor chamber into a first chamber portion and into a second chamber portion; a pressure transfer liquid, with which the first separating membrane chamber, the first channel and the first chamber portion are filled, in order to transfer pressure present on the first separating membrane via the first channel and the first chamber portion to a first side of the measuring membrane; and a transducer for producing an electrical signal dependent on deformation of the measuring membrane, wherein the deformation of the measuring membrane is a measure of the difference between a first pressure in the first chamber portion and a second pressure in the second chamber portion; wherein the pressure sensor is specified for a temperature range between a minimum temperature and a maximum temperature and wherein the pressure sensor is specified for a pressure range, wherein, at the minimum operating temperature, the pressure transfer liquid in the first chamber portion, the first channel and the first separating membrane chamber still has sufficient volume that, over the total specified pressure range, the first pressure can be introduced into the first chamber portion, without the first separating membrane coming to rest, and that, at the maximum temperature in the case of an overload, the first separating membrane is pressed against the first surface section of the sensor body, so that the entire pressure transfer liquid volume moves out of the separating membrane chamber into the first chamber portion and is accommodated via deflection of the measuring membrane, wherein the measuring membrane experiences no plastic deformation.

In a further development of the invention, $$V_{max} \leq \frac{R^4}{h} \cdot \frac{\pi}{12} \cdot (1-v^2) \cdot \frac{1}{S} \frac{\sigma_{max}}{E}, \quad (1)$$

with the safety factor $S \geq 1$, wherein $V_{max}$ is the maximum volume of the pressure transfer liquid in the separating membrane chamber in the resting position of the pressure sensor, wherein R and h are the radius and thickness, respectively, of the measuring membrane, wherein v is Poisson's ratio of the material of the measuring membrane, wherein $\sigma_{max}$ is the maximum allowable stress of the material of the measuring membrane, and wherein E is the modulus of elasticity of the material of the measuring membrane. $V_{max}$ can especially be $V(T_{max})$, wherein $T_{max}$ is the specified maximum temperature. The maximum allowable stress $\sigma_{max}$ can be, for example, the yield point of a metal material or the fracture stress of a semiconductor or a ceramic.

In a further development, S amounts, for example, to not less than 1.25, especially not less than 1.5.

In a further development of the invention, $$V_{min} \geq \frac{R^6}{h^3} \cdot \frac{\pi \cdot (1-v^2)}{16 \cdot E} \cdot p_{max}, \quad (2)$$

wherein $V_{min}$ is the minimum volume of the pressure transfer liquid in the separating membrane chamber in the resting position of the pressure sensor, and wherein $p_{max}$ is the upper limit of the specified measuring range. $V_{min}$ can especially be $V(T_{min})$, wherein $T_{min}$ is the specified minimum temperature.

In a further development of the invention, the difference between the specified maximum temperature and the specified minimum temperature amounts to not less than 125 K, preferably not less than 165 K, further preferably not less than 200 K and especially preferably not less than 220 K.

In a further development of the invention, the measuring membrane comprises a circular disk, which is essentially planar in the resting position.

In a further development of the invention, the pressure sensor is dimensioned in such a manner that, at the upper limit of the specified measuring range $p_{max}$, the maximum stress in the measuring membrane amounts to not less than 20% of the maximum allowable stress $\sigma_{max}$, especially not less than 30% of $\sigma_{max}$, preferably not less than 35% of $\sigma_{max}$. In an embodiment of this further development of the invention, the maximum stress in the measuring membrane at the upper limit of the specified measuring range $p_{max}$ can be, for example, no more than 60% and especially no more than 50% of $\sigma_{max}$.

In a further development of the invention, a capacitive pressure sensor is especially dimensioned in such a manner that, at the upper limit of the specified measuring range $p_{max}$, the magnitude of the deflection of the measuring membrane in its center amounts to not less than 20%, especially not less than 25%, and preferably not less than 30% of the equilibrium separation of the measuring membrane from a counterelectrode of a capacitive transducer.

In a further development, the measuring membrane comprises a first material, and the sensor body, at least in the region on which the measuring membrane is secured, comprises a second material, wherein the coefficient of thermal expansion $\alpha_1$ of the first material deviates by no more than 10%, preferably by no more than 5% and especially preferably by no more than 2.5% from the coefficient of thermal expansion $\alpha_2$ of the second material, thus $|(\alpha_1-\alpha_2)/\alpha_2| \leq 10\%$, preferably $|(\alpha_1-\alpha_2)/\alpha_2| \leq 5\%$ and especially preferably $|(\alpha_1-\alpha_2)/\alpha_2| \leq 2.5\%$.

In a currently preferred embodiment of the invention, the measuring membrane and the sensor body comprise steel, especially stainless steel or spring steel.

In another embodiment of the invention, the measuring membrane and/or the sensor body comprise an electrically insulating material, especially a ceramic material.

In a further development of the invention, the measuring membrane includes at least one electrode of the capacitive transducer, wherein the transducer furthermore has at least one counterelectrode, which is positioned essentially pressure independently with respect to the sensor body relative to the measuring membrane. The at least one counterelectrode can be arranged on an electrode support, especially in the first chamber portion.

The electrode support can comprise, for example, the same material as the housing, wherein the counterelectrode, and preferably also the electrode support, is electrically insulated relative to the measuring electrode.

In a further development of the invention, the counterelectrode is arranged, spaced from conductive surfaces, in such a manner, that the capacitances between the electrode of the measuring membrane and the at least one counterelectrode amount to not less than the stray capacitance between the electrodes of the capacitive transducer and the sensor body. Especially in the case of a sensor body comprising a metal material, this means that a sufficient distance between the counterelectrode and the wall of the chamber portion is to be provided. This means an increasing of the volume of the chamber portion, and especially for this case, the chamber portion in a further development of the invention contains at least one filling element, which is arranged especially between a wall of the chamber portion and the side of the counterelectrode facing away from the measuring membrane.

The sense and purpose of a filler body results especially from the following considerations:

The ratio between the maximum and the minimum volume of the pressure transfer liquid is $$\frac{V_{max}}{V_{min}} \leq (1+\beta) \cdot (1+\gamma_3 \cdot \Delta T) - \beta, \quad (3)$$

wherein $\beta$ is the ratio of the volume of the chamber portion to the volume of the pressure transfer liquid in the separating membrane chamber at the reference temperature, wherein the reference temperature can be especially the minimum temperature. Via a comparison of (3) with the quotient of (2) and (1), it follows that:

$$\beta \leq \frac{\left(\frac{h}{R}\right)^2 \cdot \frac{1}{S} \cdot \frac{4}{3} \cdot \frac{\sigma_{max}}{p_{max}} - 1}{\gamma_3 \cdot \Delta T} - 1. \quad (4)$$

If one considers, for example, a measuring membrane with a membrane thickness h of 400 µm and a radius of 2 cm, there follows in the case of a yield point of 200 MPa, a value of 20 kPa for pmax, a temperature range of 200 K in the case of $\gamma_3=0.001/K$ and S=1: $\beta \leq 20.7$. If one furthermore considers that the volume stroke of a measuring membrane has only, for instance, a third of the volume of a cylinder with the base of the measuring membrane and a height, which corresponds to the axial stroke of the measuring membrane, then only scarcely seven such cylinder volumes are available for the chamber portion of the sensor.

In the case of pressure difference sensors, somewhat more than a cylinder volume is to be provided between the measuring membrane and the counterelectrode, in order to accommodate the deflection of the measuring membrane. The remaining just under six cylinder volumes are available for the distance between counterelectrode for lessening stray capacitances and for guiding channels through the support body of the counterelectrode and the separating membrane support. The six cylinder volumes can, in given cases, suffice for this.

An increasing of the temperature use range $\Delta T$ and/or an increasing of the measuring range by increasing the upper limit of the measuring range pmax can be achieved, for example, with a filling element, which reduces the free volume of the chamber portion.

The above considerations for pressure difference sensors, according to which three times the volume stroke of the measuring membrane is required for the cylindrical movement space of the measuring membrane toward the counterelectrode, are not valid for absolute pressure or relative pressure sensors. For this sensor type, it is sufficient when in the resting position of the measuring membrane, a fraction of a volume stroke between the measuring membrane and the counterelectrode is present, in order to be able to uniformly expose the measuring membrane to pressure. This approaching of the measuring membrane to the counterelectrode lessens not only the amount of pressure transfer liquid, but it also at the same time increases the dynamic of the measurement signal.

In a further development of the invention, at a reference temperature, the filling element with the volume $V_1$ comprises a first material with a first volume expansion coefficient $\gamma_1$, and the housing body comprises a second material with a second volume expansion coefficient $\gamma_2$, wherein is: $\gamma_1 < \gamma_2$. Via suitable dimensioning, the free volume $V_2-V_1$ of the chamber portion, which is available to the pressure transfer liquid, has a larger temperature dependence, than is achieved by $\gamma_1$ or $\gamma_2$ alone. Therewith, the variable free volume $V_2-V_1$ of the chamber portion can at least partially equalize the temperature-dependent volume fluctuations of the pressure transfer liquid. A complete equalization of the volume fluctuations of the pressure transfer liquid can be achieved according to the following considerations. If $V_3$ is the total volume of the pressure transfer liquid in the chamber portion and in the separating membrane chamber at a reference temperature, $\gamma_3$ is the volume expansion coefficient of the pressure transfer liquid, and the free volume of the chamber portion is $V_2-V_1$. When:

$$V_3 = (1+x)(V_2-V_1) \quad (5),$$

and $$V_1 = V2*[(1+x)\gamma_3 - \gamma_2]/[(1+x)\gamma_3 - \gamma_1] \quad (5),$$

all temperature-related volume fluctuations of the pressure transfer liquid in the variable free volume between chamber portion and filling element are then accommodated. The number x can theoretically assume any positive values, wherein, for example: 0<x<10, especially x<5, preferably x<2. In this case, there would be practically no limitations of the temperature range, for which the pressure sensor is specified, for reasons of the thermal expansion of the pressure transfer liquid.

Insofar as in practice, other boundary conditions in any event limit the temperature use range, a complete independence of the volume expansion of the pressure transfer liquid is not absolutely required or advantageous. It is, however, quite sensible to reduce the temperature dependence via use of a filler body. Thus, according to a further development of the invention, for example at least 25%, preferably at least 50%, of the thermal expansion of the pressure transfer liquid can in each case be accommodated in the chamber portions by the increase of the free volume $V_2-V_1$.

Aside from the fact that, with the described approach, the measuring range of the pressure sensors can be enlarged, a reduced volume stroke of the pressure transfer liquid leads to less separating membrane defects.

To the extent that the (difference-) pressure sensor has a filling element, which essentially comprises an electrical insulator, the filling element can at the same time comprise the electrode support for the at least one counterelectrode. In this case, it is currently preferable that the filling element is connected in a measuring membrane side end section with the sensor body, in order to define the axial position of the at least one counterelectrode relative to the measuring membrane.

The measuring membrane itself can lie at the potential of the sensor body, or be electrically insulated relative to this. For insulated arrangements, the measuring membrane can be clamped, for example, to an annular support made of an insulating material or between two such supports.

In the case of the embodiment of the pressure sensor of the invention as a pressure difference sensor, the sensor body furthermore includes a second surface section which communicates via a second channel with the second chamber portion in the interior of the sensor body; wherein the pressure difference sensor furthermore includes: a second separating membrane, which covers the second surface section and, forming a second separating membrane chamber, is pressure-tightly connected along at least one peripheral edge with the sensor body; wherein the second separating membrane chamber, the second channel and the second chamber portion are furthermore filled with the pressure transfer liquid, in order to transfer pressure present on the second separating membrane via the second channel and the second chamber portion to the second side of the measuring membrane; wherein the pressure difference sensor is specified for a temperature range between a minimum temperature and a maximum temperature and wherein the pressure sensor is specified for a pressure difference range, wherein, at the minimum operating temperature, the pressure transfer liquid in the chamber portions still has such a volume that, over the total specified pressure difference range, the first pressure and the second pressure can be introduced into the first and second chamber portion, without one of the separating membranes coming to rest, and so that, at the maximum temperature, in the case a one-sided overload, the separating membrane is pressed from the side with the higher pressure against the surface section of the sensor body, so that the entire pressure transfer liquid volume moves out of the separating membrane chamber into the corresponding chamber portion and is accommodated by deflection of the measuring membrane, wherein the measuring membrane experiences no plastic deformation.

BRIEF DESCRIPTION OF THE DRAWINGS

The invention will now be explained in greater detail on the basis of the appended drawings, the figures of which show as follows.

DETAILED DISCUSSION IN CONJUNCTION WITH THE DRAWINGS

Figure 1:
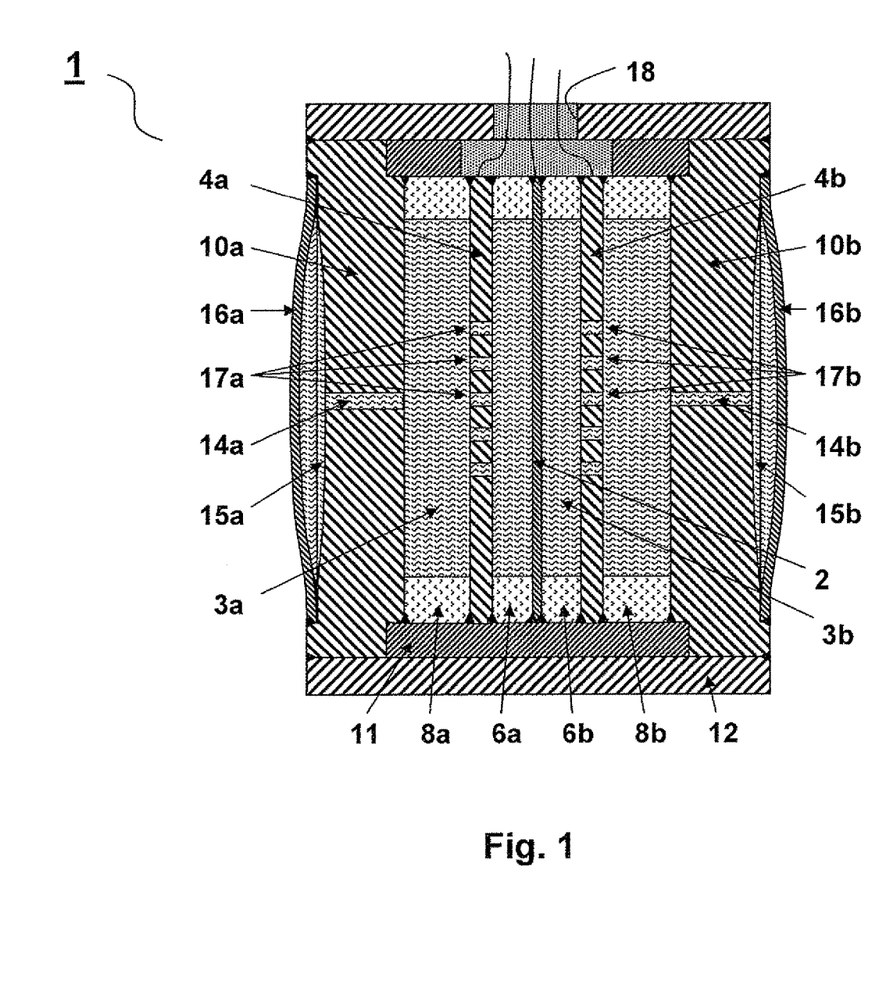
FIG. 1: is a longitudinal section through a first example of an embodiment of a pressure difference sensor of the invention.

The pressure difference sensor 1 shown in FIG. 1 includes a measuring membrane 2, which divides an inner space of a sensor body into a first chamber portion 3a and a second chamber portion 3b. In the first chamber portion 3a and in the second chamber portion 3b, an electrode support 4a, 4b is in each case arranged, wherein, for providing a pressure-dependent measurement signal, the capacitances are evaluated, on the one hand, between an electrode on the measuring membrane 2 and a first counterelectrode on a first electrode support 4a, as well as, on the other hand, between an electrode on the measuring membrane 2 and a second counterelectrode on the second electrode support 4b. The measuring membrane 2 and the two electrode supports 4a, 4b are manufactured, for example, of steel, and are electrically insulated relative to one another by a first annular insulating body 6a and a second annular insulating body 6b, wherein the insulating bodies especially can comprise a ceramic material. On the external sides of the electrode supports 4a, 4b facing away from the measuring membrane, an annular space holder 8a, 8b is in each case arranged, which preferably comprises the same material as the insulating bodies 6a, 6b. The space holders 8a, 8b, the electrode supports 4a, 4b, the insulating bodies 6a, 6b and the measuring membrane 2 are connected with one another, for example, via hard soldering, or brazing, along the peripheries of the respective contact surfaces to form a stack, wherein this stack is arranged between a first separating membrane support 10a and a second separating membrane support 10b, wherein the two separating membrane supports are, in turn, joined along the peripheries of their respective connecting surfaces with one of the spacers. The stack between the membrane support bodies has a smaller periphery than the maximum periphery of the membrane support body, whereby space remains to arrange an insulating material 11 around the stack, without exceeding the maximum periphery of the membrane support body 10a, 10b. The thus-described arrangement is positioned in a shell 12, which is secured on its two end faces, in each case via welding along the peripheral connecting line between the membrane support bodies and the shell 12. A first and, respectively, second channel 14a, 14b in each case extends through the first and second membrane support bodies 10a, 10b, into the first and, respectively, second chamber portions 3a, 3b. The end faces of the first and second membrane support bodies 10a, 10b have in each case a membrane bed, over which a separating membrane 16a, 16b is arranged, wherein the separating membranes, forming a first pressure chamber 15a and a second pressure chamber 15b between the separating membranes and the membrane beds, are pressure-tightly welded along their peripheries with the membrane support bodies. The two separating membrane chambers 15a, 15b and the two chamber portions 3a, 3b, including the channels 14a, 14b, are in each case filled with a pressure transfer liquid, in order to expose the measuring membrane 2 from the first chamber portion 3a to a first pressure, which is present on the first separating membrane 16a, and from the side of the second chamber portion 3b with a second pressure, which is present on the second separating membrane 16b. The first and the second electrode supports 4a, 4b have perforations 17a, 17b, through which pressure transmission to the measuring membrane occurs.

The measuring membrane comprises, for example, an essentially planar steel disk with a thickness of, for example, 400 micrometers, and a deflectable diameter of four centimeters. If one assumes a measuring membrane made of steel with an E-modulus of 200 gigapascals and a yield point of 200 megapascals, the measuring membrane can absorb a volume stroke of scarcely 90 microliters before the yield point is reached. The deflection of the measuring membrane in the center amounts, in such case, to a good 200 micrometers. Correspondingly, the insulating bodies 6a and 6b have, for example, a thickness of, for instance, 220 micrometers, in order to assure a sufficient distance between the measuring membrane and the electrode supports. The fill quantity of the pressure transfer liquid is dimensioned in such a manner that, at the maximum specified operating temperature in the resting position of the measuring membrane, no more than 90 microliters of pressure transfer liquid are located in the separating membrane chambers. The space holders 8a and 8b can have, for example, a thickness of 1.3 millimeters. The diameters of the channels 14a and 14b, as well as of the perforations 17a and 17b are to be dimensioned so as to be correspondingly small enough, that they achieve a negligible contribution to the total volume of the chamber portions. With this arrangement, even in the case of a cooling of the pressure difference sensor with respect to the maximum temperature, by 200 degree Celsius, such an amount of pressure transfer liquid is still contained in the separating membrane chambers, that a pressure difference of, for example, 200 millibar can be transferred to the measuring membrane, before the separating membrane comes to rest on the side of the higher pressure. For lessening the free volume in the chamber portions on the sides of the electrode supports facing away from the measuring membrane, filling elements (not shown here), especially ceramic filling elements, can be inserted.

Figure 2:
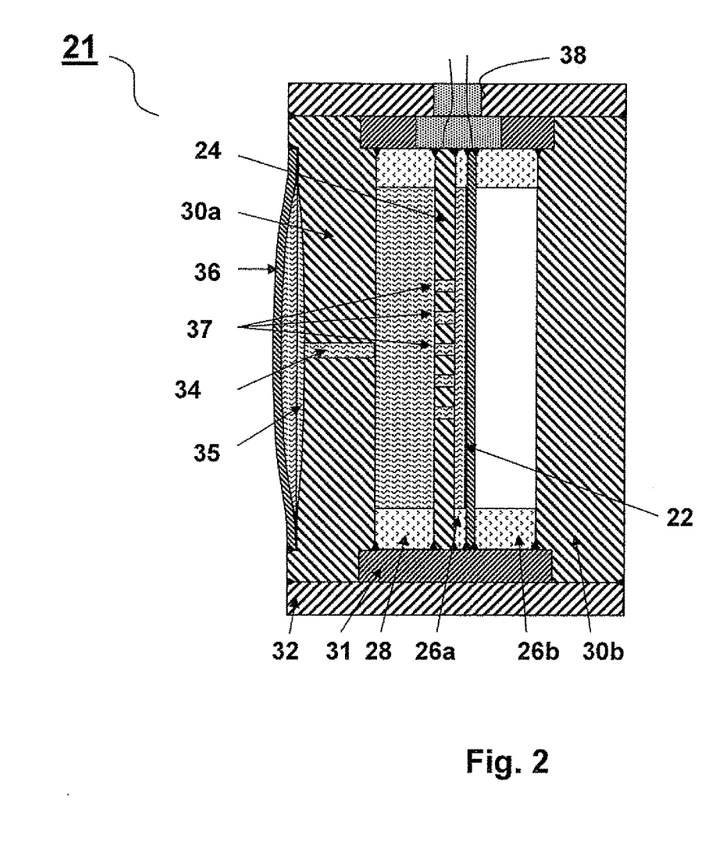
FIG. 2: is a longitudinal section through an example of an embodiment of an absolute pressure sensor of the invention.

FIG. 2 shows an absolute pressure sensor 21 of the invention, whose measuring membrane 22 divides an inner space of the sensor body into a first chamber portion and a second chamber portion, wherein the first chamber portion is filled with a pressure transfer liquid and the second chamber portion is evacuated. In the first chamber portion, the measuring membrane 22 is arranged opposite an electrode support 24, wherein between the measuring membrane 22 and the electrode support 24, an annular insulating body 26a is arranged, which preferably comprises a ceramic material. On the free end faces of the electrode support 24 and the measuring membrane 22, a first space holder 28 and, respectively, a second space holder 26b are arranged, in each case coaxially with the insulating body 26a, and connected with the electrode support 24 and, respectively, the measuring membrane 22 via hard soldering, or brazing, wherein the first spacer 28 is joined along its periphery with a membrane support body 30a placed on the end face side. The space holder 26b is pressure-tightly connected along its periphery with a rear side end plate 30b. Around the stack, which comprises the insulating body, the spacers, the electrode support and the measuring membrane, an insulating material 31 is applied peripherally between the separating membrane support 30a and the rear side end plate 30b, before this arrangement, inserted into a steel sleeve 32, is affixed via welding at the end faces of the arrangement. The membrane support body includes, in turn, a channel 34, through which the first chamber portion is contactable with a pressure. On the end of the separating membrane support 30a, a membrane bed is formed, wherein on the end, a separating membrane 36 is pressure-tightly welded along its periphery, forming a separating membrane chamber 35. The first chamber portion, the channel 34 and the separating membrane chamber 35 are, in turn, filled with a pressure transfer liquid, in order to expose the measuring membrane 22 with the pressure residing on the separating membrane. For transmission of the pressure to the measuring membrane, perforations 37 are provided in the electrode support 24.

Feedthrough 38 permits electrical connections of the electrodes to be led outwards.

Figure 3:
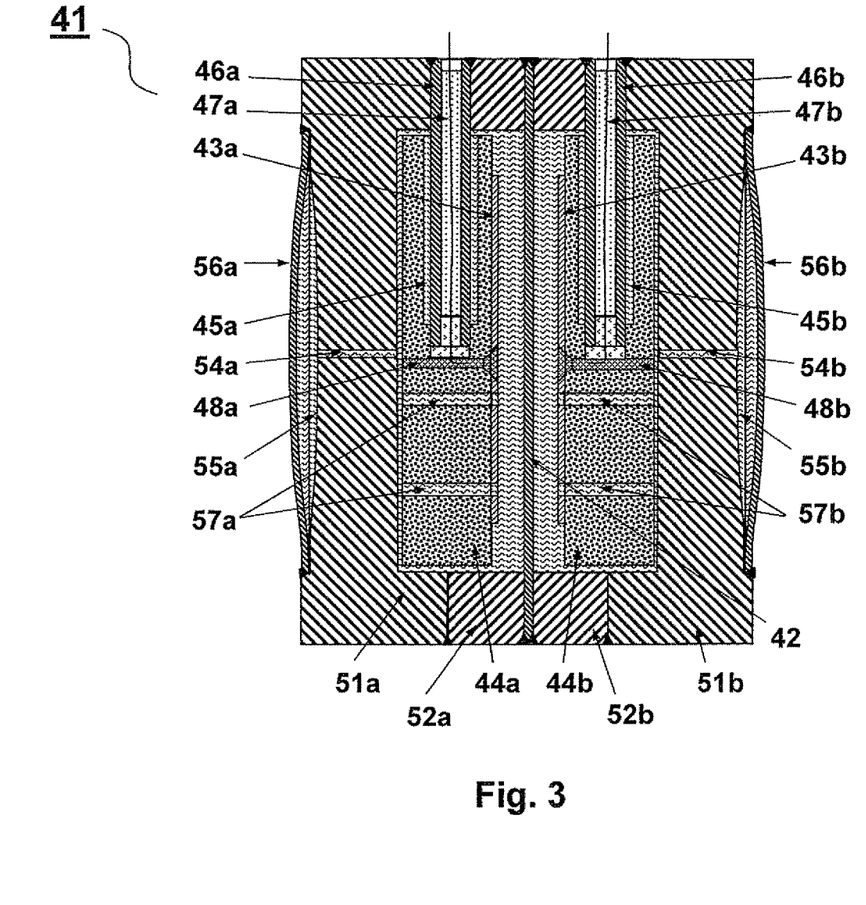
FIG. 3: is a longitudinal section through a second example of an embodiment of a pressure difference sensor of the invention.

The pressure difference sensor 41 shown in FIG. 3 includes a measuring membrane 42, which especially comprises steel and which divides an inner space of a sensor body into two chamber portions. Opposite the measuring membrane, counterelectrodes 43a, 43b are arranged in the two chamber portions on a circular plate shaped ceramic electrode support 44a, 44b. Extending from their lateral surfaces, the electrode supports in each case have at least one radial bore 45a, 45b with a tapered end section, in which a metal support tube 46a, 46b, is in each case secured. Led through the support tubes and in each case insulated from these by means of a terminal glass feedthrough and potting compound are electrical lines 47a, 47b, each of which contacts one of the counterelectrodes 43a, 43b, for example, via a solder contact 48a, 48b. The electrical lines 47a, 47b can, at least in the support tubes 46a, 46b, in each case be shielded from the potential of the support tube by a coaxial, actively driven guard electrode (not shown in detail here), which is connected to the potential of the respective counterelectrode 43a, 43b. The sensor body includes a first and a second separating membrane support 51a, 51b, as well as a first and a second annular body 52a, 52b, wherein the measuring membrane 42 is pressure-tightly secured between the two annular bodies 52a, 52b by means of peripheral welded seams. The support tubes 46a, 46b are in each case positioned between the end faces of a separating membrane support 51a, 51b and an annular body 52a, 52b in cavities in the end face, and secured there by means of welding. By peripheral welded seams along the periphery in each case between a separating membrane support 51a, 51b and an annular body 52a, 52b, the inner space of the pressure difference sensor 41 is pressure-tightly closed off from its lateral surface. Through the end faces of the separating membrane supports 51a, 51b extends, in each case, a channel 54a, 54b for allowing pressure into the two chamber portions of the pressure sensor. The end faces of the separating membrane supports 51a, 51b have in each case a membrane bed 55a, 55b, via which, in each case, a separating membrane 56a, 56b, forming a separating membrane chamber between the separating membrane 56a, 56b and the membrane bed 55a, 55b, is pressure-tightly secured with a peripheral weld seam.

The separating membrane chambers, the channels 54a, 54b and the chamber portions are in each case filled with a pressure transfer liquid in order to transfer the pressure in each case present on one of the separating membranes 56a, 56b to a side of the measuring membrane. The isostatically seated electrode supports 44a, 44b, can furthermore have traversing bores 57a, 57b in the axial direction, in order to reduce the flow resistance of the electrode supports 44a, 44b.

The electrode supports 44a, 44b have especially a ceramic material, whose expansion coefficient is smaller than the coefficient of thermal expansion of the material of the annular bodies 52a, 52b and the separating membrane supports 51a, 51b. The volume of the electrode supports is dimensioned in such a manner that at least 25% and preferably at least 50% of the thermal expansion of the pressure transfer liquid is accommodated by the increase of the free volume in the chamber portions.

The invention claimed is:

1. A pressure sensor, comprising:
a sensor body with a sensor chamber in an interior of the sensor body;
at least a first separating membrane, which, forms a first separating membrane chamber, is connected with said sensor body; and
a measuring membrane, which divides said sensor chamber into two chamber portions;
a pressure transfer liquid, with which said first separating membrane chamber, said first chamber portion and a channel therebetween are filled, in order to transfer a pressure to said measuring membrane; wherein:
the pressure sensor is specified for a temperature range between a minimum temperature and a maximum temperature, as well as for a pressure range;
at the minimum temperature, a pressure transfer liquid volume in said first chamber portion, said first channel and said first separating membrane chamber is sufficient over the total pressure range to transfer the pressure to said measuring membrane, without said first separating membrane coming to rest; and
when, in the case of overload at the maximum temperature, an entire pressure transfer liquid volume moves out of said first separating membrane chamber into said first chamber portion and is accommodated by said measuring membrane, said measuring membrane experiences no plastic deformation;
wherein $$V_{max} \leq \frac{R^4}{h} \cdot \frac{\pi}{12} \cdot (1 - \nu^2) \cdot \frac{1}{S} \frac{\sigma_{max}}{E},$$

with a safety factor S≥1, wherein Vmax is a maximum volume of the pressure transfer liquid in the separating membrane chamber in the resting position of the pressure sensor, wherein R and h are radius and thickness of the measuring membrane, respectively, wherein v is Poisson's ratio of material of the measuring membrane, wherein smax is a maximum allowable stress of the material of the measuring membrane, and wherein E is a modulus of elasticity of the material of the measuring membrane, wherein:

$$V_{min} \geq \frac{R^6}{h^3} \cdot \frac{\pi \cdot (1-v^2)}{16 \cdot E} \cdot p_{max}$$

wherein $V_{min}$ is a minimum volume of the pressure transfer liquid in the separating membrane chamber in a resting position of the pressure sensor, and wherein $p_{max}$ is an upper limit of the specified measuring range;
wherein $V_{max}=V(T_{max})$, wherein $T_{max}$ is the specified maximum temperature;
wherein $V_{min}=V(T_{min})$, wherein $T_{min}$ is the specified minimum temperature;
wherein at the upper limit of the specified measuring range $p_{max}$, a maximum stress in the measuring membrane amounts to not less than 20% of a maximum allowable stress $\sigma_{max}$;
wherein a difference between the specified maximum temperature and the specified minimum temperature amounts to not less than 125 K;
wherein said measuring membrane comprises a circular disk, which is essentially planar in the resting position; and
wherein said measuring membrane and said sensor body comprise steel.

2. The pressure sensor as claimed in claim 1, wherein:
said measuring membrane comprises a first material and said sensor body a second material; and
a coefficient of thermal expansion $\alpha_1$ of said first material deviates by no more than 10% from a coefficient of thermal expansion $\alpha_2$ of said second material.

3. The pressure sensor as claimed in claim 1, wherein:
said measuring membrane and said sensor body comprise stainless steel or spring steel.

4. The pressure sensor as claimed in claim 1, wherein:
said measuring membrane includes at least one measuring-electrode of a capacitive transducer;
said capacitive transducer furthermore has at least one counterelectrode, which is positioned essentially pressure-independently with respect to said sensor body relative to said measuring membrane.

5. The pressure sensor as claimed in claim 4, further comprising:
a housing; and
at least one electrode support, wherein:
said at least one electrode support comprises a same material as said housing; and said counterelectrode electrically is electrically insulated relative to said measuring electrode.

6. The pressure sensor as claimed in claim 4, wherein:
said counterelectrode is arranged, spaced from conductive surfaces, in such a manner, that capacitances between said at least one measuring-electrode of said measuring membrane and said counterelectrode amounts to not less than stray capacitance between the electrodes of the capacitive transducer and said sensor body.

7. The pressure sensor as claimed in claim 1, wherein:
said chamber portion contains a filling element.

8. The pressure sensor as claimed in claim 7, wherein:
in each case, at least 25% of thermal expansion of the pressure transfer liquid is accommodated by an increase of a free volume $V_2-V_1$ of a chamber portion, wherein $V_2$ is the volume of the chamber portion and $V_1$ the volume of the filler body.

9. The pressure sensor as claimed in claim 7, wherein:
said filling element is an insulator and includes an electrode support for at least one counterelectrode.

10. The pressure sensor as claimed in claim 1, wherein:
said measuring membrane lies at the potential of said sensor body.

11. The pressure sensor as claimed in claim 1, wherein:
at an upper limit of a specified measuring range $p_{max}$, the maximum stress in said measuring membrane amounts to no more than 60% of an maximum allowable stress $\sigma_{max}$.

12. The pressure sensor as claimed in claim 1, wherein:
at an upper limit of a specified measuring range $p_{max}$, a magnitude of deflection of said measuring membrane at its center amounts to not less than 20% of an equilibrium separation of said measuring membrane from a counterelectrode of a capacitive transducer, which is formed from said measuring membrane and the counterelectrode.

13. The pressure sensor as claimed in claim 1, wherein:
the pressure sensor is a pressure difference sensor, wherein said sensor body furthermore includes a second surface section, which communicates via a second channel with said second chamber portion in the interior of said sensor body;
the pressure difference sensor furthermore includes:
a second separating membrane, which covers the second surface section and, forming a second separating membrane chamber along at least one peripheral edge, is pressure-tightly connected with the sensor body;
said second separating membrane chamber, said second channel and said second chamber portion are filled furthermore with the pressure transfer liquid, in order to transfer pressure present on said second separating membrane via said second channel and said second chamber portion to a second side of said measuring membrane;
the pressure difference sensor is specified for a temperature range between a minimum temperature and a maximum temperature;
the pressure sensor is specified for a pressure difference range, wherein, at a minimum operating temperature, the pressure transfer liquid in the chamber portions still has sufficient volume that, over a total specified pressure difference range, a first pressure and a second pressure can be introduced into first and second chamber portions, without one of the separating membranes coming to rest, and that, at the maximum temperature, in the case of a one-sided overload, said separating membrane is pressed from the side with a higher pressure against a surface section of said sensor body, so that the entire pressure transfer liquid volume moves out of said separating membrane chamber into a corresponding chamber portion, and is accommodated by a deflection of said measuring membrane; and
said measuring membrane experiences no plastic deformation.

14. The pressure sensor as claimed in claim 1, wherein said difference between a specified maximum temperature and a specified minimum temperature amounts to not less than 165 K.

15. The pressure sensor as claimed in claim 1, wherein said difference between a specified maximum temperature and a specified minimum temperature amounts to not less than 200 K.

16. The pressure sensor as claimed in claim 1, wherein said difference between a specified maximum temperature and a specified minimum temperature amounts to not less than 220 K.

17. The pressure sensor as claimed in claim 2, wherein said coefficient of thermal expansion $\alpha_1$ of said first material deviates by no more than 5%, from said coefficient of thermal expansion $\alpha_2$ of said second material.

18. The pressure sensor as claimed in claim 2, wherein said coefficient of thermal expansion $\alpha_1$ of said first material deviates by no more than 2.5%, from said coefficient of thermal expansion $\alpha_2$ of said second material.

19. The pressure sensor as claimed in claim 3, wherein said measuring membrane and said sensor body comprise stainless steel or spring steel.

20. The pressure sensor as claimed in claim 5, further comprising at least one electrode support electrically insulated relative to said measuring electrode.

21. The pressure sensor as claimed in claim 7, wherein said filling element is arranged between a wall of said chamber portion and the side of the counterelectrode facing away from said measuring membrane.

22. The pressure sensor as claimed in claim 7, wherein:
in each case, at least 50% of thermal expansion of the pressure transfer liquid is accommodated by an increase of a free volume $V_2-V_1$ of a chamber portion, wherein $V_2$ is the volume of the chamber portion and $V_1$ the volume of the filler body.

23. The pressure sensor as claimed in claim 1, wherein:
at the upper limit of the specified measuring range $p_{max}$, a maximum stress in said measuring membrane amounts to not less than 30% of the maximum allowable stress $\sigma_{max}$.

24. The pressure sensor as claimed in claim 1, wherein:
at the upper limit of the specified measuring range $p_{max}$, a maximum stress in said measuring membrane amounts to not less than 35% of the maximum allowable stress $\sigma_{max}$.

25. The pressure sensor as claimed in claim 1, wherein:
at the upper limit of the specified measuring range $p_{max}$, the maximum stress in said measuring membrane amounts to no more than 50% of the maximum allowable stress $\sigma_{max}$.

26. The pressure sensor as claimed in claim 1, wherein:
at the upper limit of the specified measuring range $p_{max}$, the magnitude of the deflection of said measuring membrane at its center amounts to not less than 25% of an equilibrium separation of said measuring membrane from a counterelectrode of a capacitive transducer, which is formed from said measuring membrane and the counterelectrode.

27. The pressure sensor as claimed in claim 1, wherein:
at the upper limit of the specified measuring range $p_{max}$, the magnitude of the deflection of said measuring membrane at its center amounts to not less than 30% of an equilibrium separation of said measuring membrane from a counterelectrode of a capacitive transducer, which is formed from said measuring membrane and the counterelectrode.

* * * * *